J. W. FURREY.
LOCKING HOOK.
APPLICATION FILED NOV. 18, 1914.
1,149,041. Patented Aug. 3, 1915.
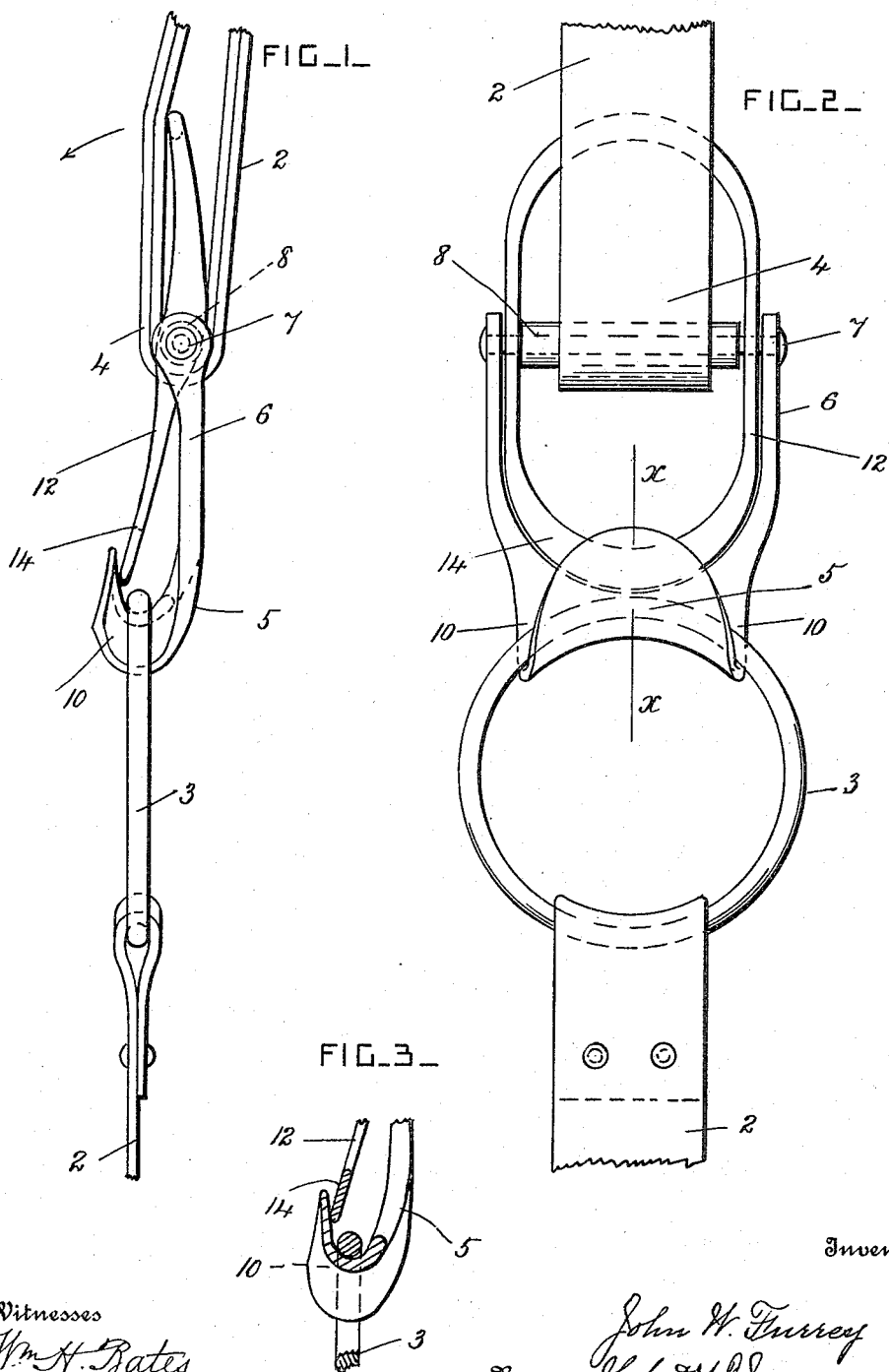

UNITED STATES PATENT OFFICE.

JOHN W. FURREY, OF VANCOUVER, WASHINGTON.

LOCKING-HOOK.

1,149,041.  Specification of Letters Patent.  Patented Aug. 3, 1915.

Application filed November 18, 1914. Serial No. 872,807.

*To all whom it may concern:*

Be it known that I, JOHN W. FURREY, a citizen of the United States, residing at Vancouver, in the county of Clarke and State of Washington, have invented certain new and useful Improvements in Locking-Hooks; and I do hereby declare the following to be a full, clear, and exact description of the invention, such as will enable others skilled in the art to which it appertains to make and use the same.

This invention relates to locking hooks specially adapted for securing the belly bands of horses in place, but which may be used for any other purpose to which they can be applied advantageously; and it consists in the novel construction and combination of the parts hereinafter fully described and claimed.

In the drawings, Figure 1 is a side view of a locking hook constructed according to this invention. Fig. 2 is a front view of the same. Fig. 3 is a cross-section, taken on the line $x$—$x$ in Fig. 2.

The belly band 2 of the horse has a ring 3 secured to one end of it, and the band 2 passes around the body of the animal and is provided with any approved means, such as a buckle, for adjusting its length. The band 2 has a loop 4 formed in its length, and this loop may be formed of a single ply of the band, or of two plies as shown.

The hook 5 is provided with a forked shank 6, and a pin 7 is secured crosswise between the end portions of the shank. A roller 8 is preferably journaled loosely on the pin 7, and engages with the loop 4 of the band or strap, and enables the length of the band or strap to be adjusted with facility without disconnecting the ring from the hook. The hook 5 is curved to correspond with the curvature of the ring 3 which is seated in it, and it has flaring end portions 10 which permit the ring to move pivotally to a limited extent upon a central longitudinal axis parallel to the shank 6. The ring can also move pivotally crosswise of the band upon its bearing or seat in the jaw of the hook.

The locking link 12 has its middle portions pivoted on the cross-pin 7, between the ends of the roller and the forked portion of the hook shank. The link 12 is pivoted so that its lower end portion 14 is free to work in the forked portion or shank of the hook and to engage with the tip of the hook. The upper portion of the locking link is pressed upon by the front stretch of the loop of the band, when the band is secured around the body of the animal, so that the lower end portion 14 is pressed against the tip of the hook, and thereby prevents the ring from being disengaged from the hook. When the ring is to be released, the upper part of the link 12 is pressed forwardly in the direction of the arrow in Fig. 1, by hand, to release the ring from the link when the ring is raised a little. The side and lower end portions of the locking link are free to pass between the side portions of the hook shank, and the fork of the hook shank has a rounded bottom similar in shape to the rounded bottom end of the link. This permits the ring 3 to be connected and disconnected with facility, and a hook with a relatively narrow space between its tip and shank can be used. The upper end portion of the link 12 is also rounded and it forms a handle for operating the link by hand. This device is specially adapted for military use as it enables a saddle to be secured or disconnected in a very short space of time. The broad flaring hook affords a long curved seat for the ring 3, so that the ring is not bent, and a light ring can be used, and the ring and the hook do not quickly wear away and break.

What I claim is:

1. In a fastening for a belly band, a hook having a forked shank, and a locking guard-link having the middle portions of its side bars pivoted to the forked shank and arranged to work between the side portions of the shank.

2. In a fastening for a belly band, a hook having a forked shank, said hook having a curved and relatively long bottom portion provided with flaring ends and adapted to engage with a ring and to permit the ring to move pivotally, and a locking guard-link having the middle portions of its side bars pivoted to the forked shank and arranged to work between the side portions of the shank and to engage with the tip of the hook.

In testimony whereof I have affixed my signature in the presence of two witnesses.

JOHN W. FURREY.

Witnesses:
G. C. CATES,
E. G. WEBBER.